United States Patent
Karlsen et al.

(10) Patent No.: US 12,501,473 B2
(45) Date of Patent: Dec. 16, 2025

(54) FILTERED USER EQUIPMENT THROUGHPUT COUNTER

(71) Applicant: Telefonaktiebolaget LM Ericsson (publ), Stockholm (SE)

(72) Inventors: Johnny Karlsen, Järfälla (SE); Mikhail Ivanov, Älvsjö (SE); Reiner Ludwig, Hürtgenwald (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 772 days.

(21) Appl. No.: 17/765,694

(22) PCT Filed: Dec. 3, 2019

(86) PCT No.: PCT/SE2019/051222
§ 371 (c)(1),
(2) Date: Mar. 31, 2022

(87) PCT Pub. No.: WO2021/066692
PCT Pub. Date: Apr. 8, 2021

(65) Prior Publication Data
US 2022/0346110 A1 Oct. 27, 2022

Related U.S. Application Data

(60) Provisional application No. 62/910,538, filed on Oct. 4, 2019.

(51) Int. Cl.
*H04W 72/543* (2023.01)
*H04W 72/1273* (2023.01)
(52) U.S. Cl.
CPC ..... *H04W 72/543* (2023.01); *H04W 72/1273* (2013.01)

(58) Field of Classification Search
CPC .............. H04L 43/0888; H04W 24/08; H04W 28/0278; H04W 76/27
See application file for complete search history.

(56) References Cited

U.S. PATENT DOCUMENTS 9,451,489 B2   9/2016   Gholmieh et al.
9,629,009 B2   4/2017   Yi et al.
(Continued)

FOREIGN PATENT DOCUMENTS

CN      102480747 A     5/2012
WO      2007104259 A1   9/2007

OTHER PUBLICATIONS

3GPP TSG-RAN WG2 Meeting #93 R2-161645; Title: Throughput measurement for Carrier Aggregation; Agenda item: 6.1.1; Source: Nokia Networks, Alcatel-Lucent, Alcatel-Lucent Shanghai Bell; WID/SID: LTE_CA_enh-Core—Release 12; Feb. 15-19, 2016 (Year: 2016).*

(Continued)

*Primary Examiner* — Romani Ohri
(74) *Attorney, Agent, or Firm* — Sage Patent Group

(57) ABSTRACT

A method performed by a base station for operating a data throughput counter in a wireless communications network is provided. The method includes determining a number of data throughput values over a determined period of time, wherein each determined data throughput value represents the data throughput associated with data transferred during a Radio Resource Connection, RRC, connection or part thereof. The method also includes incrementing the data throughput counter based on those determined throughput values for which the amount of data transferred is above a first threshold value, and/or for which the transport time of said amount of data is above a second threshold value. A base station for operating a data throughput counter in a (Continued)

wireless communications network is also provided, as well as computer programs and carriers.

21 Claims, 12 Drawing Sheets

(56) References Cited

U.S. PATENT DOCUMENTS

| | | | | |
|---|---|---|---|---|
| 2010/0034248 | A1* | 2/2010 | Gadgil | H04L 43/0888 |
| | | | | 375/225 |
| 2014/0022933 | A1* | 1/2014 | Yi | H04L 43/0888 |
| | | | | 370/253 |
| 2014/0248884 | A1* | 9/2014 | Asada | H04W 36/22 |
| | | | | 455/436 |
| 2014/0334318 | A1 | 11/2014 | Pica et al. | |
| 2016/0029233 | A1 | 1/2016 | Kollar et al. | |
| 2017/0237643 | A1 | 8/2017 | Yi et al. | |
| 2020/0107213 | A1* | 4/2020 | Park | H04L 12/1407 |
| 2020/0404556 | A1* | 12/2020 | Avraham | H04B 17/318 |

OTHER PUBLICATIONS

3GPP TSG-RAN WG2 #104bis R2-1817571; Title: Small data burst calculation clarification and corrections; Source to WG: Ericsson, Nokia, Nokia Shanghai Bell, Huawei; Source to TSG: RAN2; Date and Location: Nov. 12-16, 2018, Spokane, USA; consisting of 7 pages. (Year: 2018).*

3GPP TS 32.425; 3rd Generation Partnership Project; Technical Specification Group Services and System Aspects; Telecommunication management; Performance Management (PM); Performance measurements Evolved Universal Terrestrial Radio Access Network (E-UTRAN) (Release 16); Dec. 2018; consisting of 99 pages.

International Search Report and Written Opinion dated Jun. 30, 2020 for International Application No. PCT/SE2019/051222 filed Dec. 3, 2019; consisting of 16 pages.

3GPP TSG-RAN WG2 Meeting #93 R2-161645; Title: Throughput measurement for Carrier Aggregation; Agenda item: 6.1.1; Source: Nokia Networks, Alcatel-Lucent, Alcatel-Lucent Shanghai Bell; WID/SID: LTE_CA_enh-Core—Release 12; Document for: Discussion and Decision; Date and Location: Feb. 15-19, 2016, St. Julian's, Malta; consisting of 6 pages.

3GPP TSG-RAN WG2 #104bis R2-1817571; Title: Small data burst calculation clarification and corrections; Source to WG: Ericsson, Nokia, Nokia Shanghai Bell, Huawei; Source to TSG: RAN2; Date and Location: Nov. 12-16, 2018, Spokane, USA; consisting of 7 pages.

* cited by examiner

FILTERED USER EQUIPMENT THROUGHPUT COUNTER

CROSS-REFERENCE TO RELATED APPLICATIONS

This application is a Submission Under 35 U.S.C. § 371 for U.S. National Stage Patent Application of International Application No.: PCT/SE2019/051222, filed Dec. 3, 2019 entitled "OPERATING A DATA THROUGHPUT COUNTER IN A WIRELESS COMMUNICATIONS NETWORK," which claims priority to U.S. Provisional Application No. 62/910,538, filed Oct. 4, 2019, the entireties of both of which are incorporated herein by reference.

TECHNICAL FIELD

Embodiments herein relate to user experience in a wireless communications network. In particular, embodiments herein relate to a base station and a method therein for operating a data throughput counter in a wireless communications network. Further, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

One way for an operator to determine the level of user experience in a wireless communications network is to measure throughput. In the 3GPP specification TS 32.425, it is determined that a base station, such as e.g. a eNodeB/gNodeB, should support to measure a distribution of throughput values over a defined period of time, such as, e.g. 15 minutes. It also specifies a counter for this purpose that should be supported in order for the base station to be compliant with 3GPP. This counter may be referred to as a 23.425-tpt-counter.

According to the 3GPP specification TS 32.425, one such 23.425-tpt-counter is associated with each radio cell and is supposed to account for carrier aggregation. Each mentioned throughput value may represent the data throughput associated with data transferred during one RRC connection. Also, according to 3GPP specification TS 32.425, a RRC connection will not yield a throughput value if the per UE buffer was never non-empty. The detailed reason for this can be found in 3GPP specification TS 32.425. Hence, the mentioned distribution of throughput values according to the 23.425-tpt-counter will contain at most as many throughput values as the number of RRC connections that had been active during the mentioned defined period of time.

The measurements from the 23.425-tpt-counter are normally very important and relevant for operators of the wireless communications network because they provide a strong indication of the mobile broadband subscribers' user experience, i.e. the user experience in the wireless communications network. Further, the measurements from the 23.425-tpt-counter are often also used by the operators of the wireless communications network to decide whether or not a certain base station, such as, e.g. eNodeB/gNodeB, should get upgraded with more capacity. This may, for example, include adding an additional radio carrier or other measures to increase the throughput.

However, in some cases, the 23.425-tpt-counter described above may not accurately measure what it is supposed to measure or what the operator think is being measured, that is, the actual throughput distribution in the wireless communications network. Hence, in such case, erroneous information may be provided to the operators of the wireless communications network, which may result in unnecessary and costly investments in the wireless communications network being made.

SUMMARY

It is an object of embodiments herein to improve the user experience in a wireless communications network.

According to a first aspect of embodiments herein, the object is achieved by a method performed by a base station for operating a data throughput counter in a wireless communications network. The method may comprise determining a number of data throughput values over a determined period of time, wherein each determined data throughput value may represent the data throughput associated with data transferred during a Radio Resource Connection, RRC, connection or part thereof. Also, the method may comprise incrementing the data throughput counter based on those determined throughput values for which the amount of data transferred is above a first threshold value, and/or for which the transport time of said amount of data is above a second threshold value.

According to a second aspect of embodiments herein, the object is achieved by a base station for operating a downlink, DL, data throughput counter in a wireless communications network. The base station comprises processing circuitry configured to determine a number of data throughput values over a determined period of time, wherein each determined data throughput value represents the data throughput associated with data transferred during a Radio Resource Connection, RRC, connection or part thereof. Also, the processing circuitry is configured to increment the data throughput counter based on those determined throughput values for which the amount of data transferred is above a first threshold value, and/or for which the transport time of said amount of data is above a second threshold value. Further, the base station comprises power supply circuitry configured to supply power to the base station.

According to a third aspect of the embodiments herein, a computer program is also provided configured to perform the method described above. Further, according to a fourth aspect of the embodiments herein, carriers are also provided configured to carry the computer program configured for performing the method described above.

By excluding throughput values that are based on too little data and/or too little time as described above, an enhanced counter in comparison to the 23.425-tpt-counter is obtained. This means that operator and service providers of a wireless communications network may be provided with a simple yet accurate and reliable way to monitor user experience in the wireless communications network. It also means that the operator and service providers of a wireless communications network are able to detect radio cells that are becoming overloaded, and therefore may require a capacity expansion in order to maintain suitable level of user experience. Hence, the user experience in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
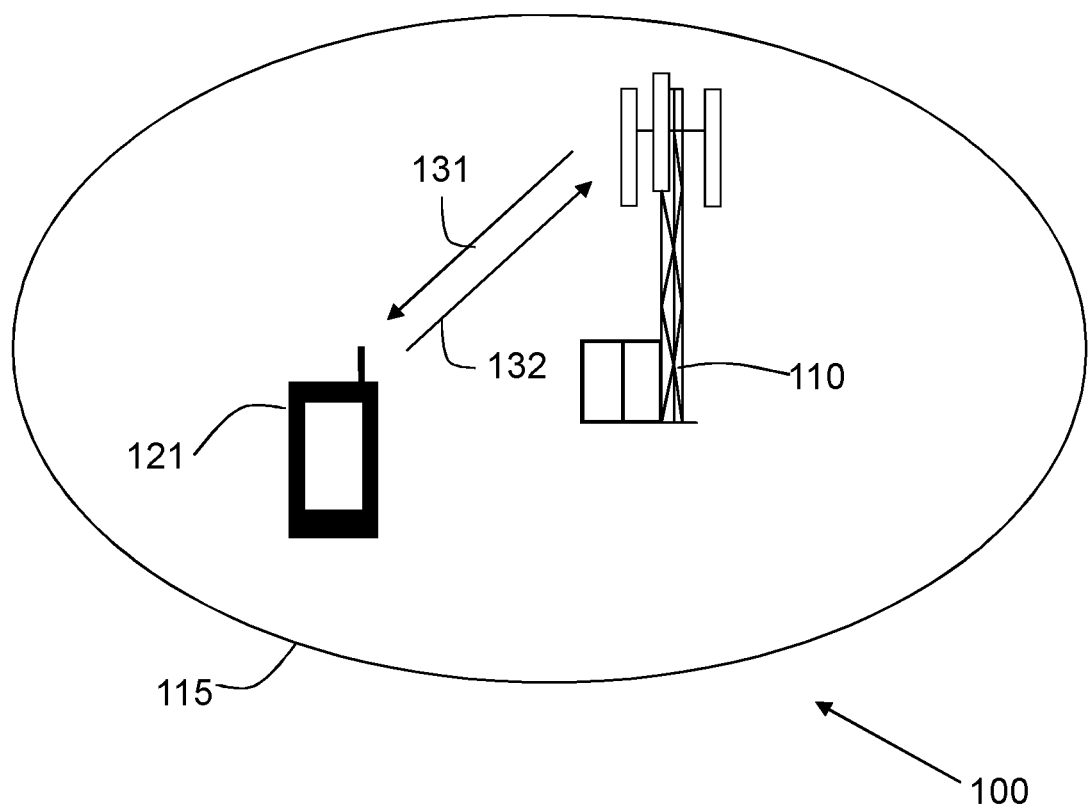
FIG. 1 is schematic illustration of a base station and a wireless device in a wireless communications network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, a wireless device 121 is located within the cell 115. The wireless device 121 is configured to communicate within the wireless communications network 100 via the network node 110 over a radio link served by the network node 110. Utilizing the radio link, a bi-directional communications flow may be set up between the wireless device 121 and any entity capable of communication via the wireless communications network 100. The wireless device 121 may transmit data over an air or radio interface to the radio base station 110 in uplink, UL, transmissions 132 and the radio base station may transmit data over an air or radio interface to the wireless devices in downlink, DL, transmissions 131. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication.

As part of the developing of the embodiments described herein, it has been realized that there currently exist certain challenge(s) with the 23.425-tpt-counter. In fact, the definition of the 23.425-tpt-counter include at least two major flaws.

Figure 2:
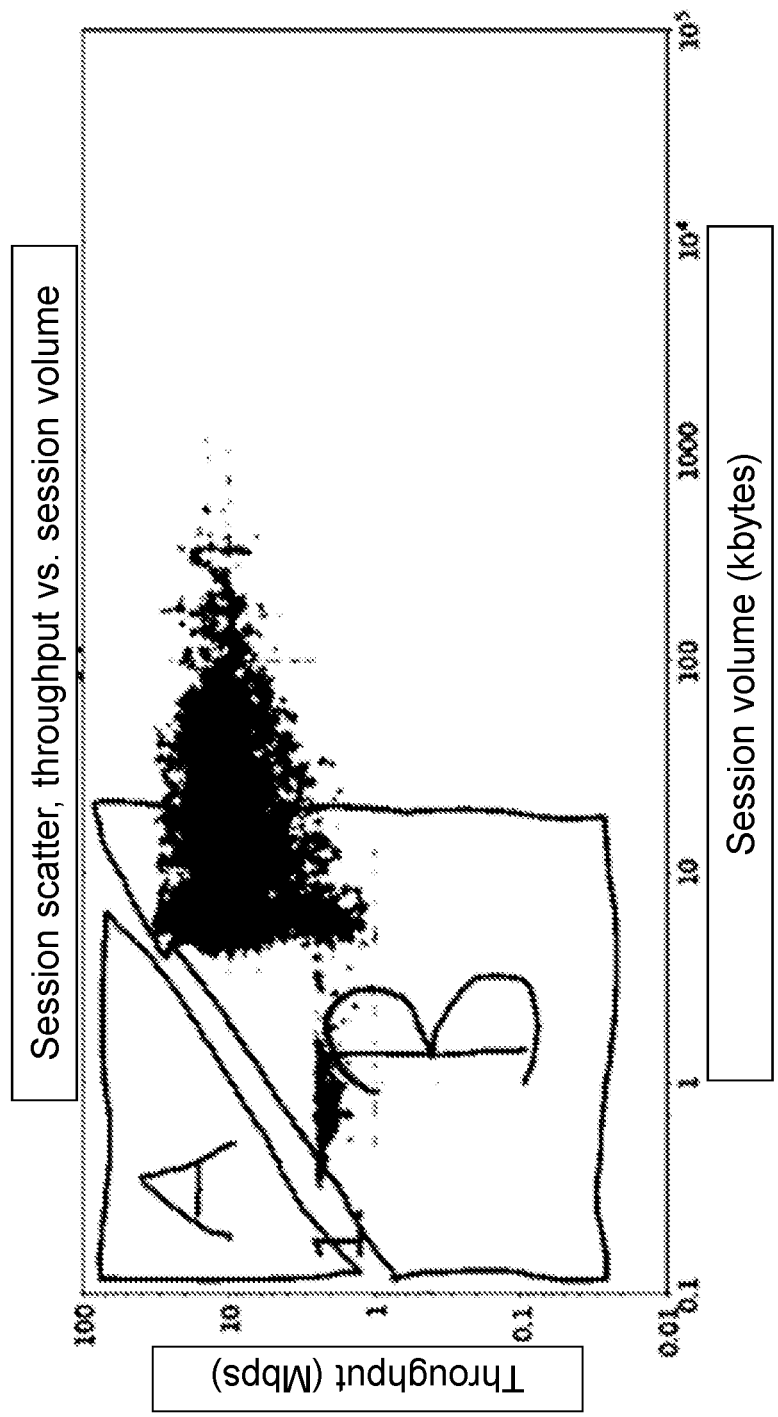
FIG. 2 is a diagram indicating a distribution of throughput values in a wireless communications network according to a 23.425-tpt-counter.

FIG. 2 shows a throughput distribution from the 23.425-tpt-counter which comprise at least two major flaws which both lead to a strong biases in the throughput distribution from the 23.425-tpt-counter. These are denoted as area/flaw A and area/flaw B in FIG. 1. Each flaw by itself and both flaws in combination may result in a drastic underestimation of average values, such as, e.g., median, 90th percentile, etc., that operators commonly derive from the throughput distribution from the 23.425-tpt-counter. These are then used as input to decision making about aspects in the wireless communications network, such as, e.g. how and where to perform capacity expansion.

In realizing flaw A in the throughput distribution from the 23.425-tpt-counter, it is noted that flaw A reveals that a certain kind of RRC connections is not considered at all by the 23.425-tpt-counter. These are RRC connections where the per UE buffer was never non-empty. At the same time, these are RRC connections that in most cases would have resulted in a large throughput value had the UE buffer been non-empty at least once. This flaw A may create a strong bias, i.e. area/flaw A in FIG. 2, in the throughput distribution because a relatively great number of RRC connections are probably of this kind.

In realizing flaw B in the throughput distribution from the 23.425-tpt-counter, it is noted that flaw B may be described as "too little data in too much time" and is the result of the fact that the smallest unit of time over which throughput may be calculated in LTE is the so-called Transmission-Time-Interval, TTI, of 1 ms. This flaw B may also create a strong bias, e.g. area/flaw B in FIG. 2, in the throughput distribution. More specifically, the 23.425-tpt-counter may also include RRC connections that are too small in terms of the data volume and/or in terms of the time, which are both the input values to calculate the mentioned throughput value. Those RRC connections may not be observed by the system long enough to measure the mentioned throughput value with sufficient reliability, as denoted by the area/flaw B in FIG. 2.

Embodiments described herein provide solutions to the challenges described above with reference to FIG. 2. In other words, by excluding throughput values that are based on too little data and/or too little time may provide advantageous effects to overcome the flaws A and B, as described above with reference to FIG. 2, when determining data throughput distribution in a base station in wireless communications network. In the embodiments described below, a description of counters and attributes thereof are provided. The counters described in the embodiments herein may also be referred to as filtered user equipment throughput counters.

Figure 3:
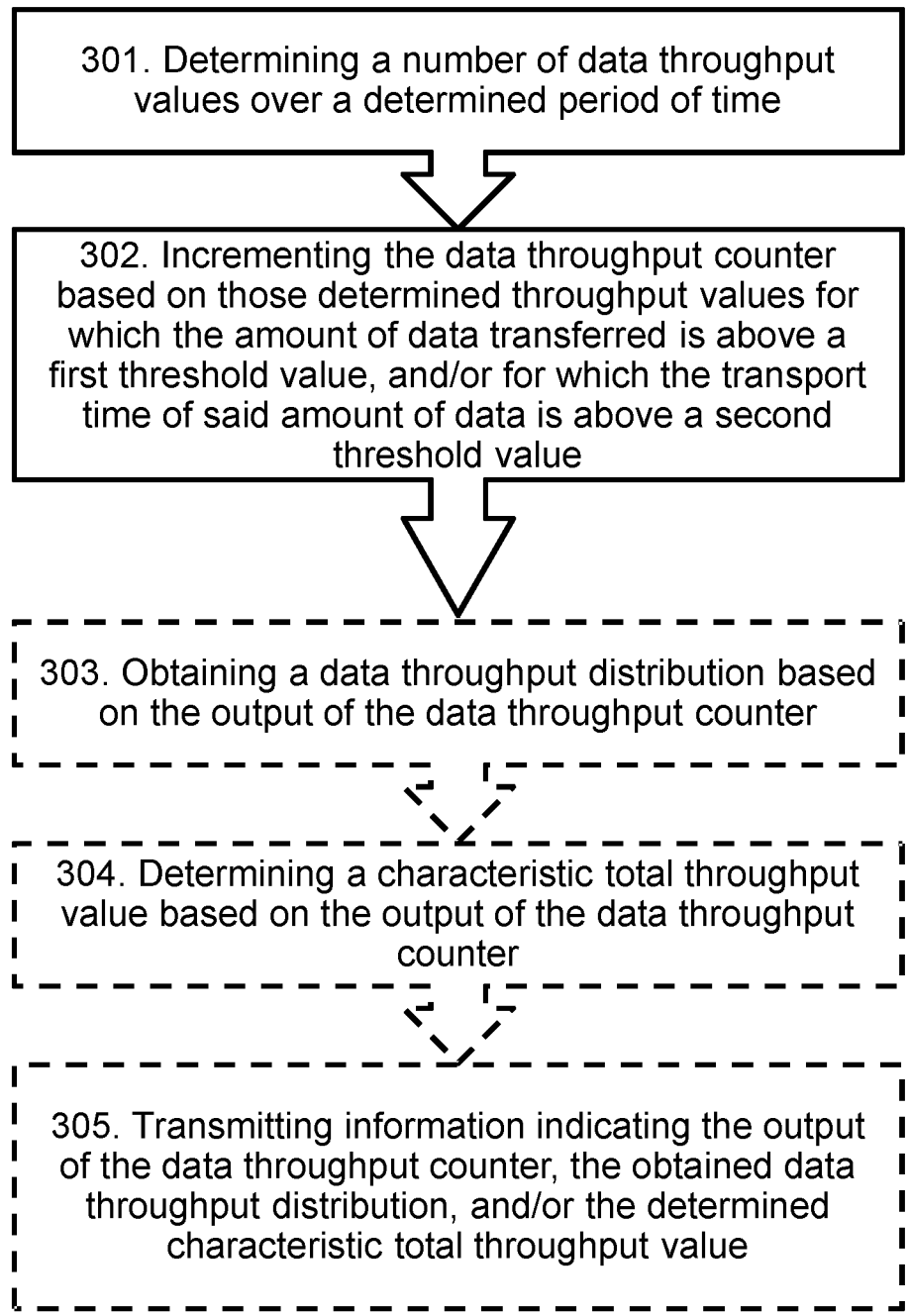
FIG. 3 is a flowchart depicting embodiments of a method in a base station.

Examples of embodiments of a method performed by a base station 110 for operating a data throughput counter in a wireless communications network 100 will now be described with reference to the flowchart depicted in FIG. 3. FIG. 3 is an illustrated example of actions or operations which may be taken by the base station 110 in the wireless communication network 100. The method may comprise the following actions.

Action 301

The base station 110 determines a number of data throughput values over a determined period of time, wherein each determined data throughput value represents the data throughput associated with data transferred during a Radio Resource Connection, RRC, connection or part thereof.

Here, it should be noted that in 5G, and potentially also in 4G, there is a suspend resume procedure where an RRC connection can be very long and interrupted by a suspend and then resume. In these cases, the individual parts may, according to embodiments herein, be treated as their own sessions with a measurement for each sub part. In other words, each determined data throughput value may also represents the data throughput associated with data transferred during a session. For both 4G, such as, e.g. an LTE network, and 5G, such as, e.g. a New Radio (NR) network, this would then mean one individual throughput value per session. However, in 5G, it should be noted that one RRC connection may contain one or more sessions. In more detailed, this may also be described as one individual throughput value for each session that had at least one transmission period with a non-empty buffer. Here, it should be noted that the data transfer may be performed in a downlink, DL, direction or uplink, UL, direction in the wireless communication network 100.

Action 302

After the determination in Action 301, the base station 110 increments the data throughput counter based on those determined throughput values for which the amount of data transferred is above a first threshold value, and/or for which the transport time of said amount of data is above a second threshold value. This enables a data throughput distribution or a characteristic total throughput value as described in Actions 303-304 below to be obtained. In other words, the base station 110 may increment the data throughput counter based only, i.e. explicitly, on those determined throughput values for which the amount of data transferred is above a first threshold value, and/or for which the transport time of said amount of data is above a second threshold value. Here, the term "incrementing" the data throughput counter also may be referred to as stepping, clocking, or pegging the data throughput counter.

According to some embodiments, the amount of data may be associated with a Packet Data Convergence Protocol, PDCP, data volume in a UE session, and wherein the first threshold value may be a PDCP data volume threshold. In some embodiments, the amount of data may be associated with a Radio Link Control, RLC, data volume in a UE session, and wherein the first threshold value may be a RLC data volume threshold. In some embodiments, the amount of data may be associated with a Medium Access Control, MAC, data volume in a UE session, and wherein the first threshold value may be a MAC data volume threshold. The examples listed above should be considered as mere examples, and not as an exclusive list of alternatives for which amount of data is to be considered. Further, the transport time may be a portion of the time that a RRC connection is active. In some embodiments, the portion of the time that the RRC connection is active may correspond to the time during which a data buffer associated with the mentioned RRC connection is non-empty.

Action 303

Optionally, after the incrementing of the data throughput counter in Action 302, the base station 110 may obtain a data throughput distribution based on the output of the data throughput counter. This means that a data throughput distribution is established based on determined throughput values for which the amount of data transferred is above a first threshold value, and/or for which the transport time of said amount of data is above a second threshold value.

It should here be noted that the above description does not exclude the possibility of using determined throughput values for which the amount of data transferred is above a first threshold value and for which the transport time of said amount of data is above a second threshold value, together with determined throughput values that only fulfils one of these criteria in order to obtain the total throughput distribution. In other words, the total throughput distribution may be a function of the output of the data throughput counter where there are values based on the throughput values that exceeds both the first and second thresholds, and additionally also a number of values which exceeds the first threshold, but not the second threshold, or vice versa.

Action 304

Alternatively, after the incrementing of the data throughput counter in Action 302, the base station 110 may determine a characteristic total throughput value based on the output of the data throughput counter. This means that a characteristic total throughput value is established based on determined throughput values for which the amount of data transferred is above a first threshold value, and/or for which the transport time of said amount of data is above a second threshold value. In some embodiments, the characteristic total throughput value may, for example, be an average value, a median value, a percentile value, or similar.

Also here, it should be noted that the above description does not exclude the possibility of using determined throughput values for which the amount of data transferred is above a first threshold value and for which the transport time of said amount of data is above a second threshold value, together with determined throughput values that only fulfils one of these criteria in order to obtain the characteristic total throughput value. In other words, the characteristic total throughput value may be a function of the output of the data throughput counter where there are values based on the throughput values that exceeds both the first and second thresholds, and additionally also a number of values which exceeds the first threshold, but not the second threshold, or vice versa.

Action 305

According to some embodiment, the base station 110 may transmit information indicating the output of the data throughput counter, the obtained data throughput distribution, and/or the determined characteristic total throughput value. The base station may, for example, transmit to a network node in the wireless communications network 100. Optionally, in some embodiments, the base station 110 may also obtain user data and forward the user data to a host computer or a wireless device.

Figure 4:
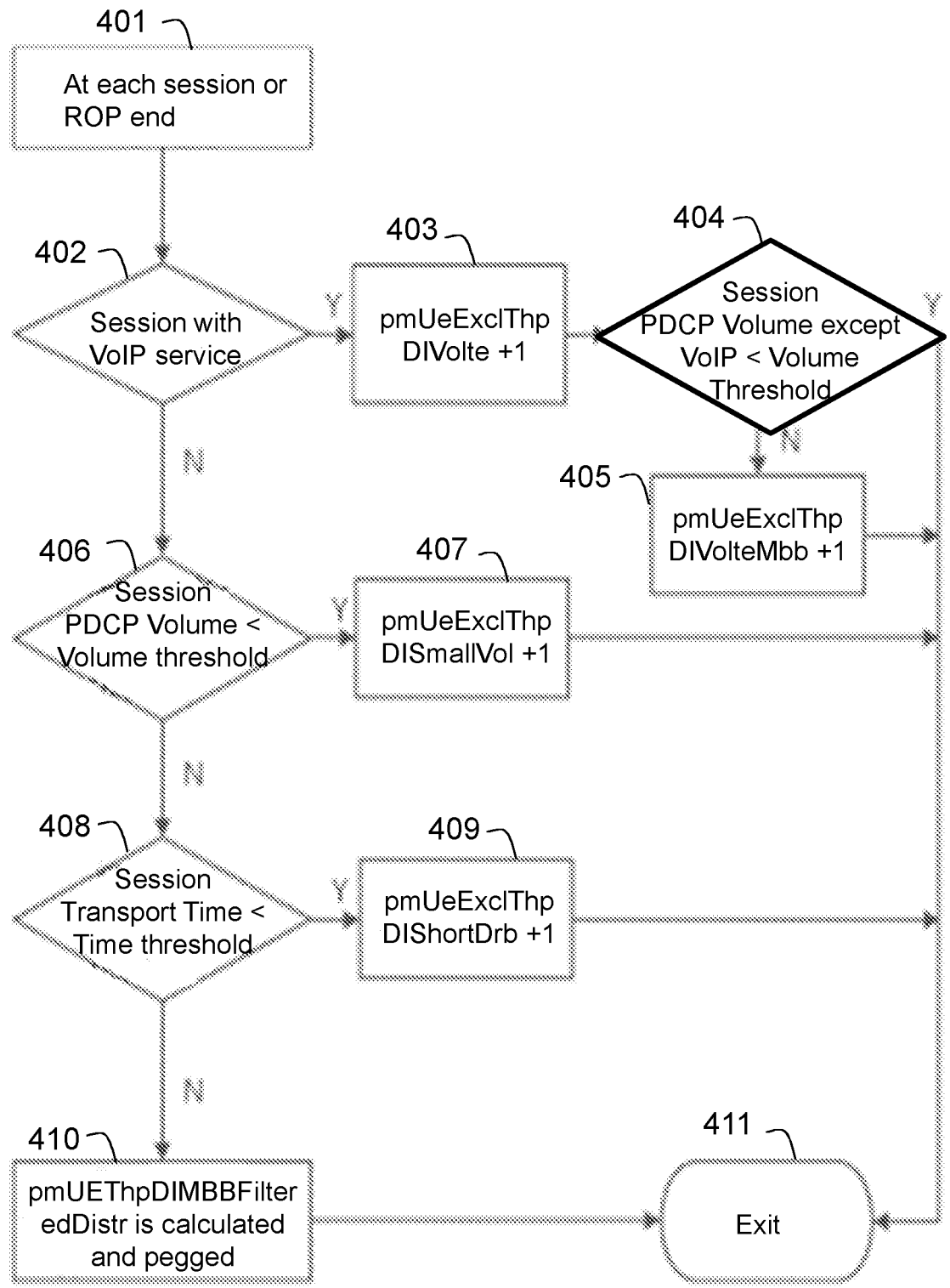
FIG. 4 is another flowchart depicting embodiments of a method in a base station.

Examples of embodiments of the method performed by a base station 110 for operating a data throughput counter in a wireless communications network 100 described with reference FIG. 3 will now be described with reference to the flowchart depicted in FIG. 4. FIG. 4 is an illustrated example of actions or operations which may be taken by the base station 110 in the wireless communication network 100.

In other words, FIG. 4 is a flow chart illustrating some embodiments of a method for operating a data throughput counter in a wireless communications network, and exemplifies in which order the different conditions may be evaluated and respective counters may be pegged. Here, it may be noted that the fifth counter, referred to as pmUeThpDlMbbFilteredDistr in FIG. 4, is a counter which may operate as a replacement of the implementation of the 23.425-tpt-counter in the base station 110. MBB may refer to Mobile Broadband, PDCP may refer to Packet Data Convergence Protocol, and DRB may refer to Data Radio Bearer. The method may comprise the following actions.

Action 401

Initiation of the procedure may begin at the end of each UE data session or radio opportunity, ROP.

Action 402

After initiation, the base station 110 may determine if the data session is associated with a VolP service. If YES (Y), then the base station proceeds to Action 403. Otherwise, the base station 110 proceeds to Action 406.

Action 403

The base station 110 may here increment a first counter, referred to here as pmUeExclThpDlVolte This may be performed when a specific condition is fulfilled. The specific condition may, for example, be that the UE data session contains QCI1 DRB. The first counter, pmUeExclThpDlVolte, may be implemented to keep track of the number of user equipment (UEs), i.e. wireless devices, that are excluded from DL throughput calculation due to VoLTE traffic.

Action 404

After incrementing of the first counter in Action 403, the base station 110 may determine if the PDCP volume of the UE data session is below a certain volume threshold. If NO (N), then the base station 110 may proceed to Action 405. Otherwise, the base station 110 may proceed to Action 411 and end the procedure.

Action 405

After the determination in Action 404, the base station 110 may increment a second counter, referred to as pmUeExclThpDlVolteMbb. This may be performed when a specific condition is fulfilled. The specific condition may, for example, be when all PDCP volume except QCI1 in the UE data session is greater than a threshold value. The second counter, pmUeExclThpDlVolteMbb, may be implemented to keep track of the number of user equipment (UEs), i.e. wireless devices, that are excluded from DL throughput calculation due to VoLTE traffic but with simultaneous sizable MBB traffic. The base station 110 may then proceed to Action 411 and end the procedure.

Action 406

After determining that the UE data session is not a VoIP service, the base station 110 may determine if a session PDCP volume of the UE data session is below a certain volume threshold. For example, an attribute filterUeDlThpVolThr=100 {0 . . . 4000} may define a PDCP volume threshold for fifth counter pmUeThpDlMbbFilteredDistr in Action 410 below. This means that a UE data session with PDCP volume less than this threshold is filtered out.

If YES (Y), then the base station 110 may proceed to Action 407. Otherwise, the base station 110 proceed to Action 408.

Action 407

The base station 110 may here increment a third counter, referred to here as pmUeExclThpDlSmallVol. This may be performed when a specific condition is fulfilled. The specific condition may, for example, be that the UE data session PDCP volume is less than a data volume threshold. The third counter, pmUeExclThpDlSmallVol, may be implemented to keep track of the number of MBB user equipment (UEs), i.e. wireless devices, that are excluded from DL throughput calculation due to small data volume. The base station 110 may proceed to Action 411 and end the procedure.

Action 408

After determining that the PDCP volume of the UE data session is above a certain volume threshold in Action 406, the base station 110 may determine if a session transport time of the UE data session is below a certain time threshold. For example, an attribute filterUeDlThpTimeThr=50 {0 . . . 200} may define DRB transport time threshold for the fifth counter pmUeThpDlMbbFilteredDistr in Action 410 below. This means that a UE data session with DRB transport time less than this threshold is filtered out.

If YES (Y), then the base station 110 may proceed to Action 409. Otherwise, the base station 110 proceed to Action 410.

Action 409

The base station 110 may here increment a fourth counter, referred to here as pmUeExclThpDlShortDrb. This may be performed when a specific condition is fulfilled. The specific condition may, for example, be that the UE data session time is less than a DRB time threshold. The fourth counter, pmUeExclThpDlShortDrb, may be implemented to keep track of the number of MBB user equipment (UEs), i.e. wireless devices, that are excluded from DL throughput calculation due to short transport time. The base station 110 may then proceed to Action 411 and end the procedure.

Action 410

After determining that the session transport time of the UE data session is above a certain time threshold in Action 408, the base station 110 may increment a fifth counter, referred to here as pmUeThpDlMbbFilteredDistr. This may be performed when a specific condition is fulfilled. The specific condition may, for example, be when the UE session is MBB only, and both the PDCP volume and the DRB time are bigger than their respective thresholds. The fifth counter, pmUeThpDlMbbFilteredDistr, may be implemented to obtain a distribution of the filtered MBB UE DL throughput, i.e. e.g. obtain a throughput distribution as described in Action 303 or determine a characteristic total throughput value as described in Action 304. The base station 110 may then proceed to Action 411 and end the procedure.

Figure 5:
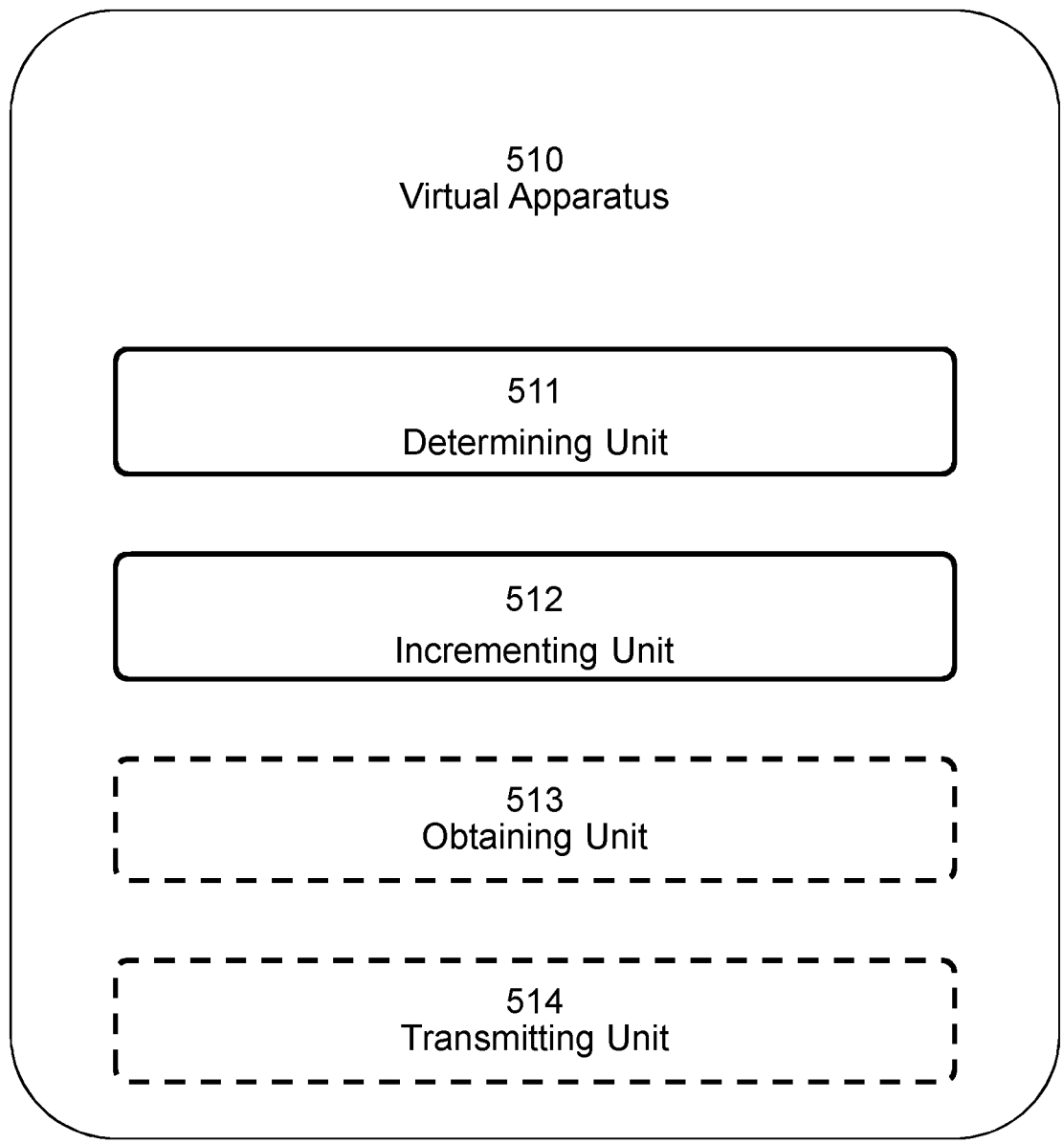
FIG. 5 is a block diagram depicting embodiments of a base station.

To perform the method actions in a base station 110 for operating a data throughput counter in a wireless communications network 100, the base station 110 may comprise the following arrangement depicted in FIG. 5. FIG. 5 shows a schematic block diagram of embodiments of a virtual apparatus 510 that may be implemented in base station 110.

Figure 6:
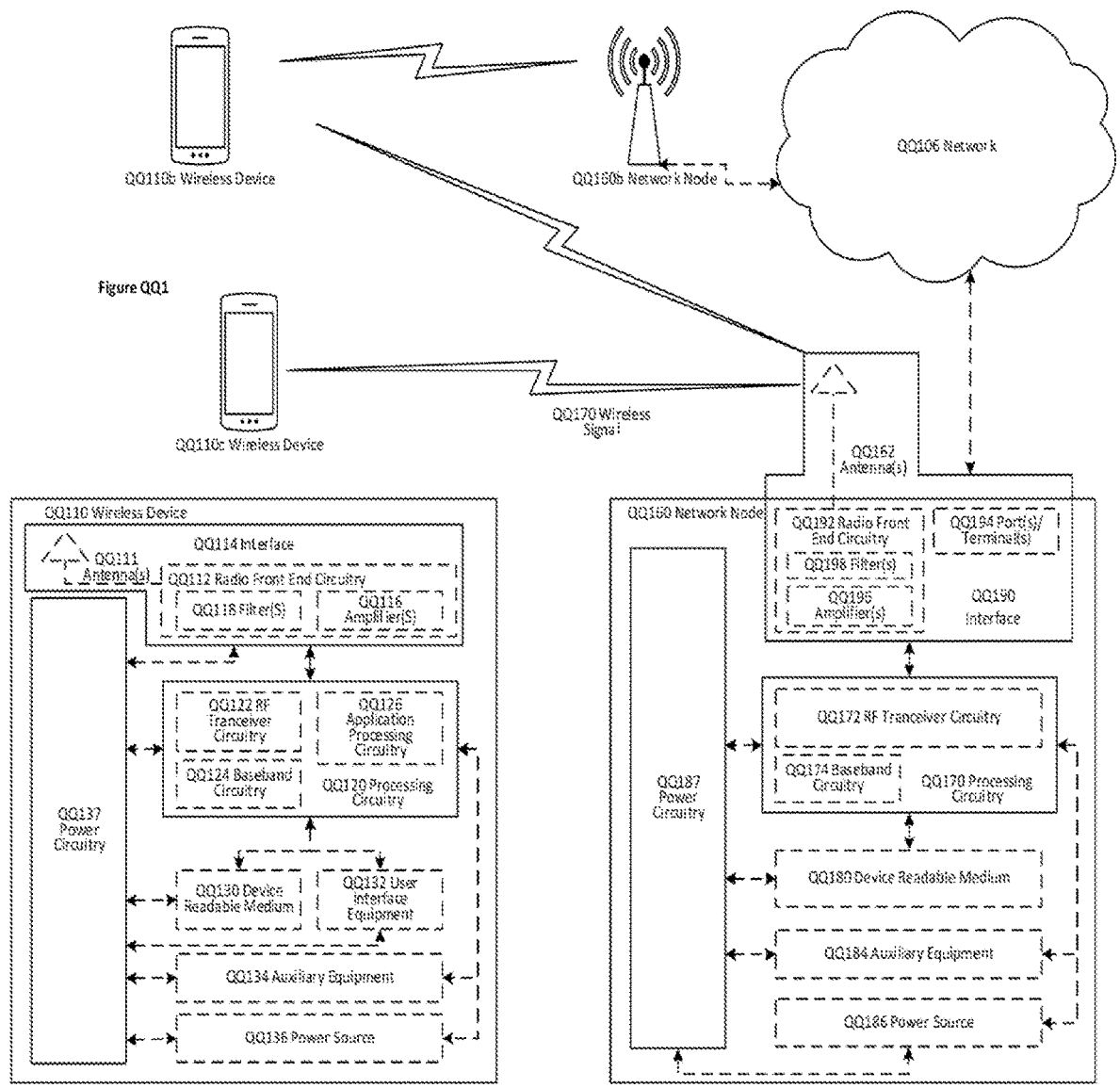
FIG. 6 is a schematic illustration of a wireless network in accordance with some embodiments.

FIG. 5 illustrates a schematic block diagram of embodiments of an apparatus 510 in a wireless communications network 100 (for example, the wireless network shown in FIG. 1 or FIG. 6). The apparatus 510 may be implemented in a base station or network node 110 (e.g. the network node QQ160 shown in FIG. 6). Apparatus 510 is operable to carry out the example method described with reference to FIGS. 4-5, and possibly any other processes or methods disclosed herein. It is also to be understood that the method of FIGS. 4-5 is not necessarily carried out solely by apparatus 510. At least some operations of the method can be performed by one or more other entities.

Apparatus 510, also referred to as a virtual apparatus implemented in a base station, may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determining unit 511 and a incrementing unit 512, and any other suitable units of apparatus 510 to perform corresponding functions according one or more embodiments of the present disclosure.

The base station 110 or processing circuitry therein is configured to, or may comprise the determining unit 511 configured to, determining a number of data throughput values over a determined period of time, wherein each determined data throughput value represents the data throughput associated with data transferred during a Radio Resource Connection, RRC, connection or part thereof. Also, the base station 110 or processing circuitry therein is configured to, or may comprise the incrementing unit 511 configured to, incrementing (also referred to as stepping, clocking or pegging) the data throughput counter based on those determined throughput values for which the amount of data transferred is above a first threshold value, and/or for which the transport time of said amount of data is above a second threshold value.

In some embodiments, the amount of data is associated with a Packet Data Convergence Protocol, PDCP, data volume in a UE session, and wherein the first threshold value is a PDCP data volume threshold. Alternatively, the amount of data is associated with a Radio Link Control, RLC, data volume in a UE session, and wherein the first threshold value is a RLC data volume threshold. Another option may be that the amount of data is associated with a Medium Access Control, MAC, data volume in a UE session, and wherein the first threshold value is a MAC data volume threshold. Also, according to some embodiments, the transport time is a portion of the time that a RRC connection is active. In this case, according to some embodiments, the portion of the time that the RRC connection is active corresponds to the time during which a data buffer associated with the mentioned RRC connection is non-empty.

In some embodiments, the base station 110 or processing circuitry therein may be configured to, or may comprise an obtaining unit 513 configured to, obtain a data throughput distribution based on the output of the data throughput counter. In some embodiments, the base station 110 or processing circuitry therein may be configured to, or may comprise the determining unit 511 configured to, determine a characteristic total throughput value based on the output of the data throughput counter. In some embodiments, the base station 110 or processing circuitry therein may be configured to, or may comprise an transmitting unit 514 configured to, transmit, to a network node in the wireless communications network 100, information indicating the output of the data throughput counter, the obtained data throughput distribution, and/or the determined characteristic total throughput value. In some embodiments, the data transfer may be performed in an downlink, DL, direction or uplink, UL, direction in the wireless communication network 100.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 6 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 7:
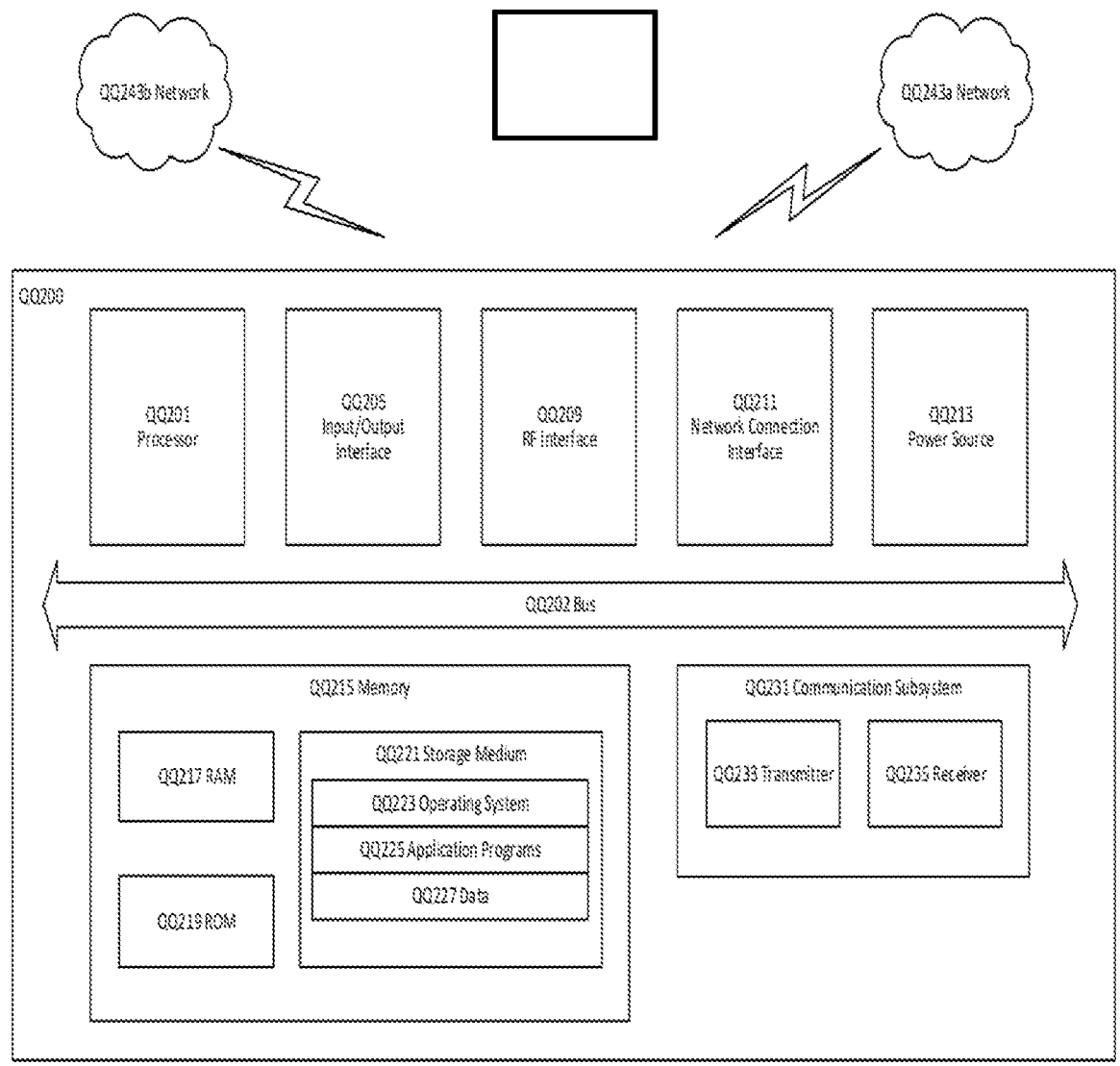
FIG. 7 is a schematic illustration of a user equipment.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 7 is a UE, the components discussed herein are equally applicable to a WD, and vice-versa.

In FIG. 7, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 7, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 8:
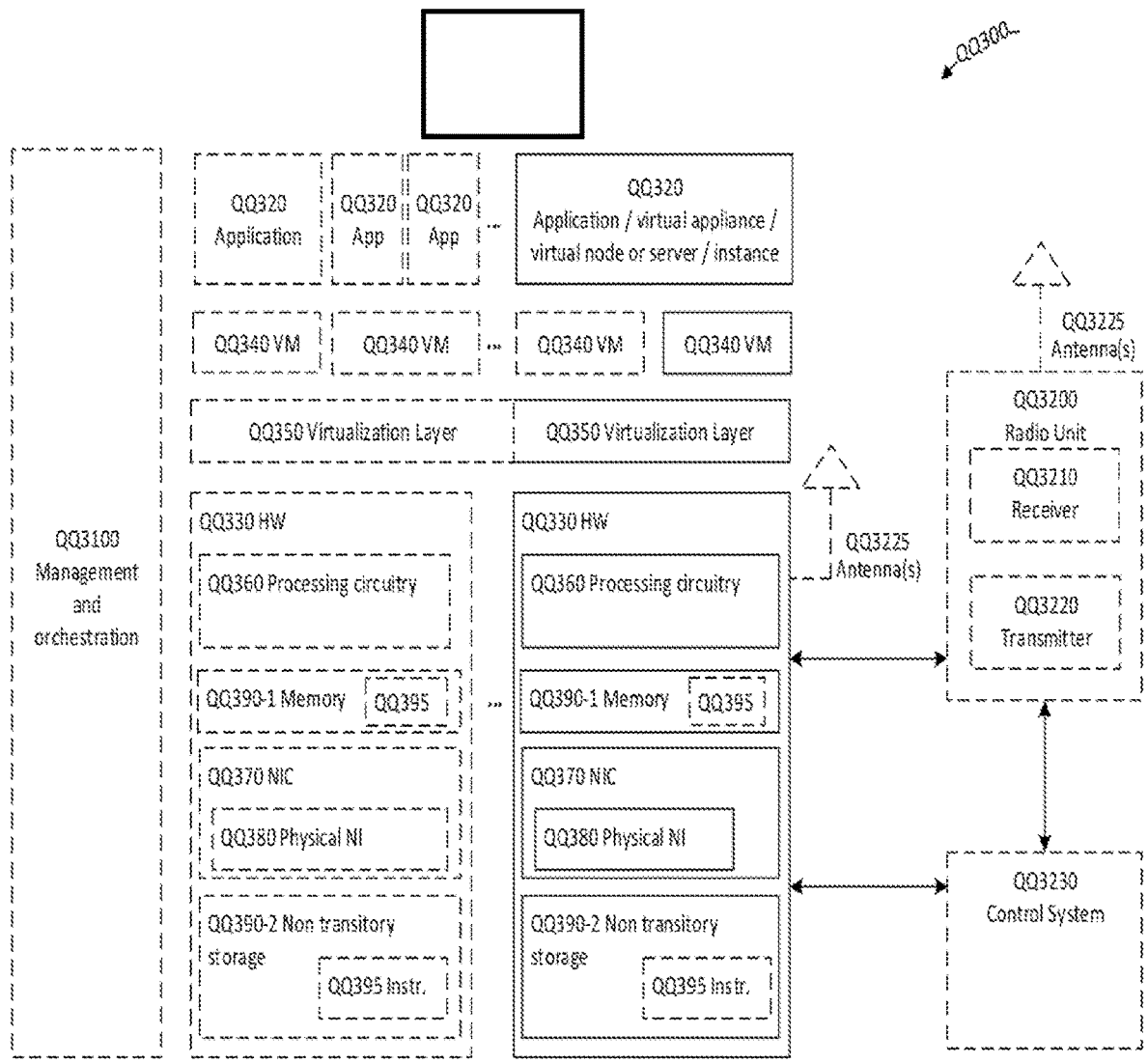
FIG. 8 is a schematic illustration of a virtualization environment in accordance with some embodiments, FIG. 9 schematically illustrates a telecommunication network connected via an intermediate network to a host computer.

FIG. 8 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 8, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 9:
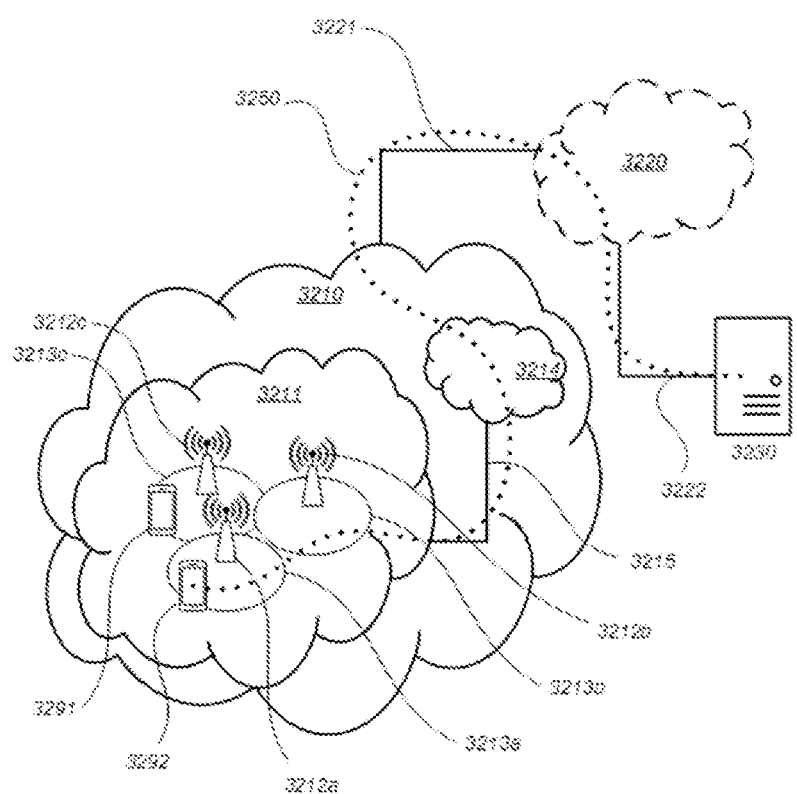

With reference to FIG. 9, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 9 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 10. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 10) served by base station QQ520. Communication interface QQ526 may be configured to facilitate connection QQ560 to host computer QQ510. Connection QQ560 may be direct or it may pass through a core network (not shown in FIG. 10) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides. It is noted that host computer QQ510, base station QQ520 and UE QQ530 illustrated in FIG. 10 may be similar or identical to host computer QQ430, one of base stations QQ412a, QQ412b, QQ412c and one of UEs QQ491, QQ492 of FIG. 9, respectively. This is to say, the inner workings of these entities may be as shown in FIG. 10 and independently, the surrounding network topology may be that of FIG. 9.

Figure 10:
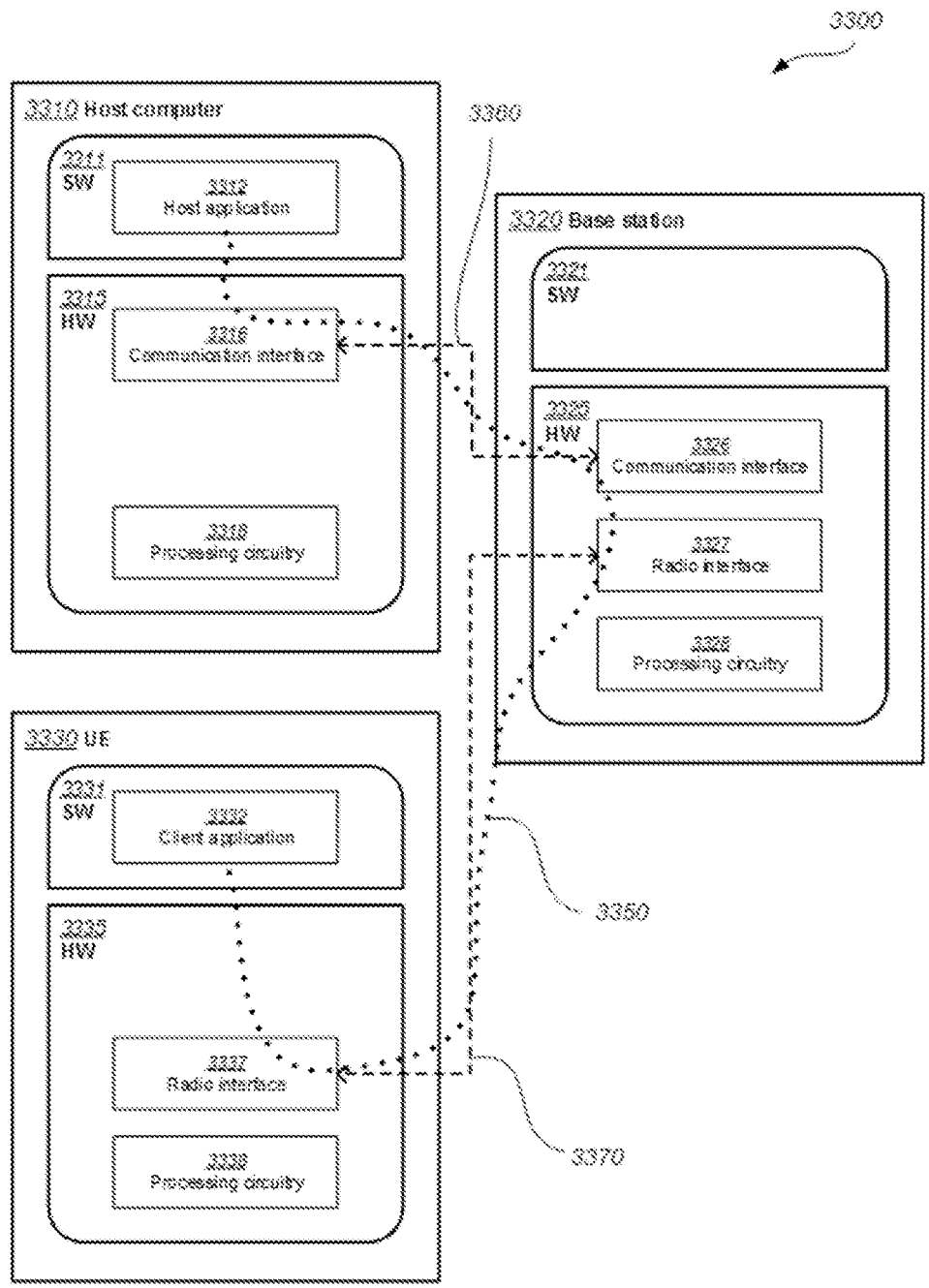
FIG. 10 is a generalized block diagram of a host computer communicating via a base station with a user equipment over a partially wireless connection.

In FIG. 10, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the monitoring of user experience (which e.g. may be used by operators to decide whether a certain eNodeB/gNodeB should get upgraded with more capacity, for example, by adding an additional radio carrier, and thereby provide benefits such as reduced user waiting time.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 11, 12:
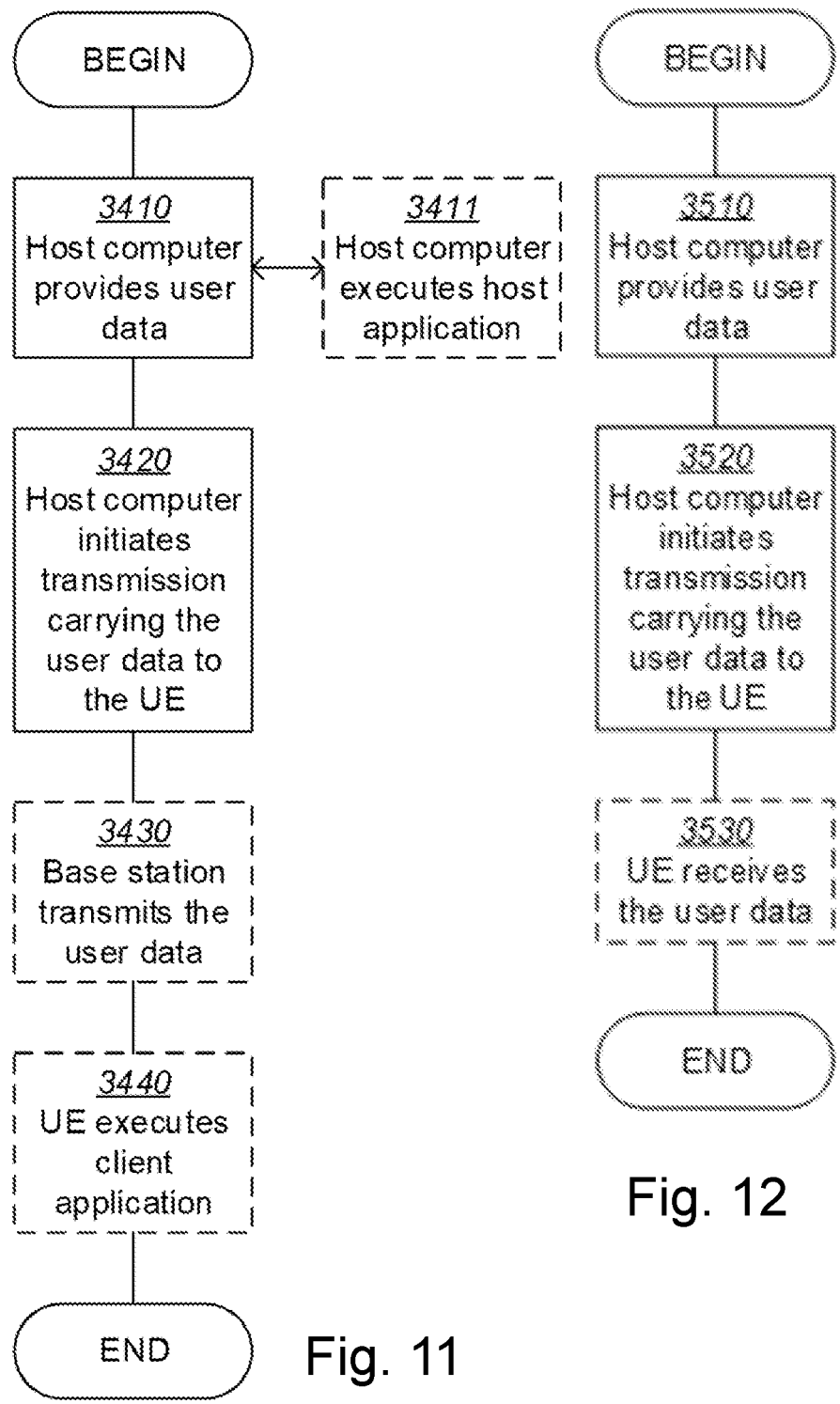
FIGS. 11-14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 13:
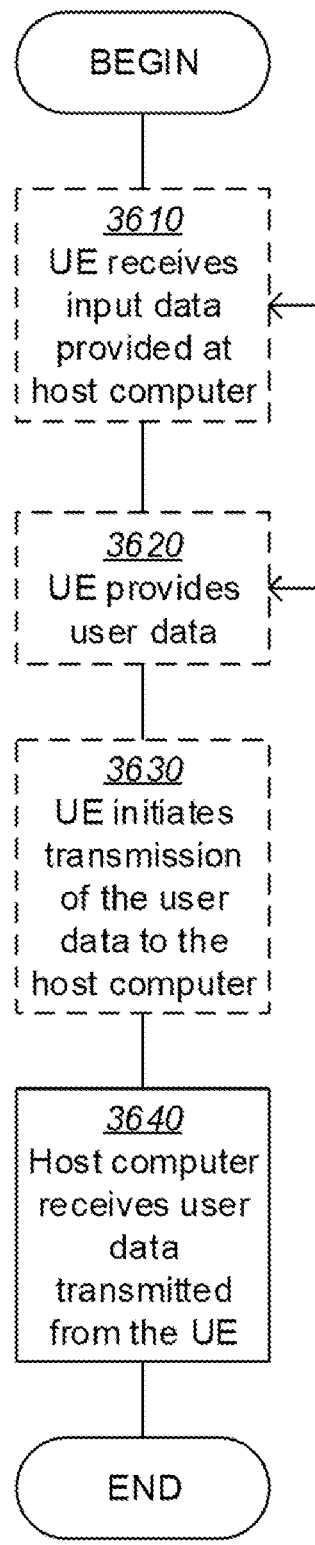

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 14:
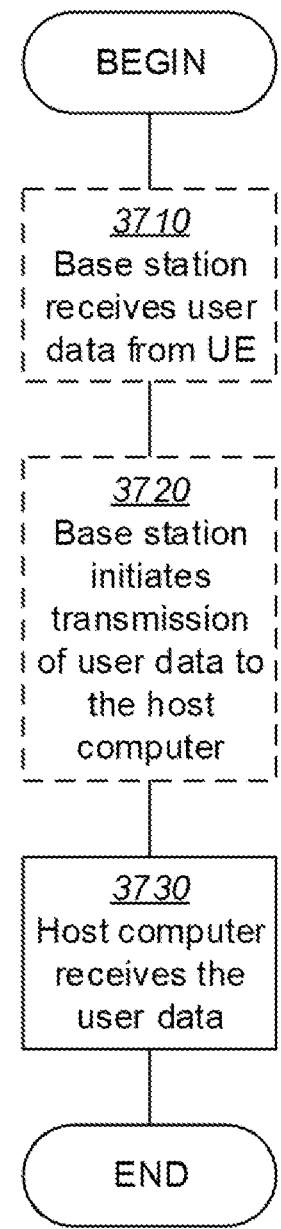

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

FURTHER ASPECTS OF SOME EMBODIMENTS

According to one embodiment, a communication system including a host computer is provided. The communication system comprises: processing circuitry configured to provide user data; and a communication interface configured to forward the user data to a cellular network for transmission to at least one user equipment (UE), wherein the cellular network comprises a base station having a radio interface and processing circuitry, the base station's processing circuitry configured to perform any of the steps of the methods described with reference to FIG. 3-4 above.

This communication system may further include the base station. Also, the communication system may further including at least one UE, wherein the at least one UE is configured to communicate with the base station. Further, in the communication system, the processing circuitry of the host computer may be configured to execute a host application, thereby providing the user data; and the at least one UE may comprise processing circuitry configured to execute a client application associated with the host application.

According to another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the base station performs any of the steps of the methods described with reference to FIG. 3-4 above. The method may comprise, at the base station, transmitting the user data. Further, in the method, the user data may be provided at the host computer by executing a host application. Additionally, the method may further comprise, at the UE, executing a client application associated with the host application.

According to a further embodiment, a user equipment (UE) configured to communicate with a base station is provided. The UE may comprise a radio interface and processing circuitry configured to perform the method as described above.

According to yet a further embodiment, a communication system including a host computer comprising a communication interface configured to receive user data originating from a transmission from a user equipment (UE) to a base station is provided. The base station comprises a radio interface and processing circuitry, the base station's processing circuitry configured to perform any of the steps of the methods described with reference to FIG. 3-4 above. The communication system may further including the base station. Also, the communication system may further including the UE, wherein the UE is configured to communicate with the base station. Further, in the communication system, the processing circuitry of the host computer may be configured to execute a host application; and the UE may be configured to execute a client application associated with the host application, thereby providing the user data to be received by the host computer.

The embodiments herein are not limited to the above described preferred embodiments. Various alternatives, modifications and equivalents may be used. Therefore, the above embodiments should not be construed as limiting.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CA Carrier Aggregation
DL Downlink
DRB Data Radio Bearer
eNB E-UTRAN NodeB
E-UTRA Evolved UTRA
E-UTRAN Evolved UTRAN
GERAN GSM EDGE Radio Access Network
gNB Base station in NR
GSM Global System for Mobile communication
LTE Long-Term Evolution
MAC Medium Access Control
MBB Mobile Broadband
NR New Radio
OFDM Orthogonal Frequency Division Multiplexing
OFDMA Orthogonal Frequency Division Multiple Access
PDCP Packet Data Convergence Protocol
RAN Radio Access Network
RAT Radio Access Technology
RRC Radio Resource Control
SI System Information
SIB System Information Block
UE User Equipment
UL Uplink
VoIP Voice-over-IP

The invention claimed is:

1. A method performed by a base station for operating a data throughput counter in a wireless communications network, the method comprising:
    determining a number of data throughput values over a determined period of time, each determined data throughput value representing the data throughput associated with data transferred during a Radio Resource Connection (RRC) connection or part thereof; and
    incrementing the data throughput counter based on those determined throughput values at least one of:
        for which the amount of data transferred is above a first threshold value; and
        for which the transport time of the amount of data is above a second threshold value, wherein the amount of data includes Packet Data Convergence Protocol (PDCP) data volume except QoS Class Identifier (QCI) data in a data session.

2. The method of claim 1, wherein the amount of data is associated with the PDCP data volume in a UE session, and wherein the first threshold value is a PDCP data volume threshold.

3. The method of claim 1, wherein the amount of data is associated with a Radio Link Control (RLC) data volume in a UE session, and wherein the first threshold value is a RLC data volume threshold.

4. The method of claim 1, wherein the amount of data is associated with a Medium Access Control (MAC) data volume in a UE session, and wherein the first threshold value is a MAC data volume threshold.

5. The method of claim 1, wherein the transport time is a portion of the time that a RRC connection is active.

6. The method of claim 5, wherein said portion of the time that the RRC connection is active corresponds to the time during which a data buffer associated with the mentioned RRC connection is non-empty.

7. The method of claim 1, further comprising:
    obtaining a data throughput distribution based on the output of the data throughput counter.

8. The method of claim 1, further comprising: determining a characteristic total throughput value based on the output of the data throughput counter.

9. The method of claim 1, further comprising:
    transmitting, to a network node in the wireless communications network, information indicating at least one of:
        the output of the data throughput counter;
        the obtained data throughput distribution; and
        the determined characteristic total throughput value.

10. The method of claim 1, wherein the data transfer is performed in one of a downlink (DL) direction and an uplink (UL) direction in the wireless communication network.

11. A base station for operating a downlink (DL) data throughput counter in a wireless communications network, the base station comprising:
processing circuitry configured to:
determine a number of data throughput values over a determined period of time, each determined data throughput value representing the data throughput associated with data transferred during a Radio Resource Connection (RRC) connection or part thereof, and to increment the data throughput counter based on those determined throughput values at least one of:
for which the amount of data transferred is above a first threshold value; and
for which the transport time of the amount of data is above a second threshold value; and
power supply circuitry configured to supply power to the base station,
wherein the amount of data includes Packet Data Convergence Protocol (PDCP) data volume except QoS Class Identifier (QCI) data in a data session.

12. The base station of claim 11, wherein the amount of data is associated with the PDCP data volume in a UE session, and wherein the first threshold value is a PDCP data volume threshold.

13. The base station of claim 11, wherein the amount of data is associated with a Radio Link Control (RLC) data volume in a UE session, and wherein the first threshold value is a RLC data volume threshold.

14. The base station of claim 11, wherein the amount of data is associated with a Medium Access Control (MAC) data volume in a UE session, and wherein the first threshold value is a MAC data volume threshold.

15. The base station according to claim 11, wherein the transport time is a portion of the time that a RRC connection is active.

16. The base station of claim 15, wherein said portion of the time that the RRC connection is active corresponds to the time during which a data buffer associated with the mentioned RRC connection is non-empty.

17. The base station of claim 11, wherein the processing circuitry is further configured to obtain a data throughput distribution based on the output of the data throughput counter.

18. The base station of claim 11, wherein the processing circuitry is further configured to determine a characteristic total throughput value based on the output of the data throughput counter.

19. The base station of claim 11, wherein the processing circuitry is further configured to transmit, to a network node in the wireless communications network, information indicating at least one of:
the output of the data throughput counter;
the obtained data throughput distribution; and
the determined characteristic total throughput value.

20. The base station of claim 11, wherein the data transfer is performed in one of a downlink (DL) direction and an uplink (UL) direction in the wireless communication network.

21. A non-transitory computer storage medium storing an executable computer program, comprising instructions which, when executed on at least one processing circuitry, cause the at least one processing circuitry to perform a method, the method comprising:
determining a number of data throughput values over a determined period of time, each determined data throughput value representing the data throughput associated with data transferred during a Radio Resource Connection (RRC) connection or part thereof; and
incrementing a data throughput counter based on those determined throughput values at least one of:
for which the amount of data transferred is above a first threshold value; and
for which the transport time of the amount of data is above a second threshold value, wherein the amount of data includes Packet Data Convergence Protocol (PDCP) data volume except QoS Class Identifier (QCI) data in a data session.

* * * * *